United States Patent
Kakkara et al.

(10) Patent No.: US 12,119,020 B2
(45) Date of Patent: Oct. 15, 2024

(54) AUDIOMETRIC RECEIVER SYSTEM TO DETECT AND PROCESS AUDIO SIGNALS

(71) Applicant: International Business Machines Corporation, Armonk, NY (US)

(72) Inventors: Sajesh Sreedharan Kakkara, Pune (IN); Pravin Kailashnath Kedia, Deonar (IN); Sudhir Bhaurao Titirmare, Pune (IN)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 17/303,622

(22) Filed: Jun. 3, 2021

(65) Prior Publication Data

US 2022/0392484 A1    Dec. 8, 2022

(51) Int. Cl.
*G10L 25/60*     (2013.01)
*G10L 21/034*    (2013.01)
*G10L 25/21*     (2013.01)
*H04L 9/12*      (2006.01)
*H04R 3/00*      (2006.01)

(52) U.S. Cl.
CPC .......... *G10L 25/60* (2013.01); *G10L 21/034* (2013.01); *G10L 25/21* (2013.01); *H04L 9/12* (2013.01); *H04R 3/00* (2013.01)

(58) Field of Classification Search
CPC ....... G10L 25/60; G10L 21/034; G10L 25/21; G10L 19/018; H04L 9/12; H04R 3/00; G01S 7/52001; G10K 11/006; H04B 11/00; B63G 8/39
See application file for complete search history.

(56) References Cited

U.S. PATENT DOCUMENTS

| | | | |
|---|---|---|---|
| 9,915,743 B2 | 3/2018 | Sallas | |
| 10,725,149 B1 | 7/2020 | Premus | |
| 2004/0225810 A1* | 11/2004 | Hiratsuka | G06F 13/385 710/305 |
| 2005/0195992 A1* | 9/2005 | Kiuchi | G10L 25/00 704/E21.009 |

(Continued)

FOREIGN PATENT DOCUMENTS

JP    2010081395 A    4/2010

OTHER PUBLICATIONS

Hammami et al. "Encrypted Audio Communication Design using Synchronized Discrete-Time Hyperchaotic Maps", Jul. 2016, 10th International Symposium on Communication Systems, Networks and Digital Signal Processing, pp. 1-6 (Year: 2016).*

(Continued)

*Primary Examiner* — Kenneth W Chang
(74) *Attorney, Agent, or Firm* — Eric W. Chesley (57) ABSTRACT

In an approach for detecting and processing multiple audio signals simultaneously, an audiometric receiver system comprises a transmitter, wherein the transmitter comprises a digital signal processor, and wherein the digital signal processor comprises a quality check component, an amplifier or attenuator component, mixer component, a modulator component, and an encrypter component; and a receiver, wherein the receiver comprises a decrypter component, a demodulator component, a splitter component, and a second amplifier or attenuator component.

15 Claims, 5 Drawing Sheets

(56) References Cited

U.S. PATENT DOCUMENTS

| | | | | |
|---|---|---|---|---|
| 2006/0126861 | A1* | 6/2006 | Saliterman | H04R 1/1041 381/79 |
| 2006/0127052 | A1* | 6/2006 | Furukawa | G11B 27/034 386/326 |
| 2008/0031475 | A1* | 2/2008 | Goldstein | H04R 1/1016 381/151 |
| 2010/0134319 | A1* | 6/2010 | Rhodes | H04B 13/02 375/240 |
| 2010/0249962 | A1* | 9/2010 | Inoue | G10L 19/005 700/94 |
| 2012/0008463 | A1* | 1/2012 | Badiey | H04B 11/00 367/131 |
| 2013/0121517 | A1* | 5/2013 | Anderson | H04R 25/43 381/321 |
| 2013/0288592 | A1* | 10/2013 | Ben-Tolila | H04B 7/2606 455/11.1 |
| 2015/0036464 | A1* | 2/2015 | Moriguchi | H04B 11/00 367/137 |
| 2015/0110289 | A1* | 4/2015 | Bongiovi | H03G 5/165 381/98 |
| 2018/0054684 | A1* | 2/2018 | Coenen | H03G 7/007 |

OTHER PUBLICATIONS

Anonymous et al., "Why is sound important to marine animals?", University of Rhode Island and Inner Space Center, Copyright 2002-2020, 5 Pages.

Authors et al.: Disclosed Anonymously, "Audiometric Alerting System Based on the Sound Classification Analytics", An IP.com Prior Art Database Technical Disclosure, IP.com No. IPCOM000263303D, IP.com Electronic Publication Date: Aug. 16, 2020, 3 Pages.

Britto et al., "Audio Watermarking with Encryption", International Journal of Engineering Research & Technology (IJER), ISSN: 2278-0181, vol. 6, Issue 09, Sep. 2017, 4 Pages.

Harvey, Matt, "Acoustic Detection of Humpback Whales Using a Convolutional Neural Network", Google AI Blog, Oct. 29, 2018, 9 Pages.

Jiang et al., "Self-Contained High-SNR Underwater Acoustic Signal Acquisition Node and Synchronization Sampling Method for Multiple Distributed Nodes", Journal of Sensors, vol. 19, Issue 21, Nov. 1, 2019, 21 Pages.

Mellinger et al., "MobySound: A reference archive for studying automatic recognition of marine mammal sounds", Applied Acoustics, vol. 67, Issues 11-12, pp. 1226-1242, Nov.-Dec. 2006, 17 Pages.

NOAA, "Why do whales make sounds?", National Ocean Service, National Oceanic and Atmospheric Administration, U.S. Department of Commerce, Feb. 26, 2021, 1 Page.

O'Leary, Mary Beth, "Unlocking marine mysteries with artificial intelligence", MIT News, Massachusetts Institute of Technology, Dec. 14, 2017, 5 Pages.

Peng et al., "An Ultra-Lightweight Encryption Scheme in Underwater Acoustic Networks", Hindawi Publishing Corporation, Journal of Sensors, vol. 2016, Article ID: 8763528, Feb. 18, 2016, 11 Pages.

Robertson, Perry J., "Digital Attenuator Design", Sandia Report, SAND2012-10095, Unlimited Release, Sandia National Laboratories, Nov. 2012, 55 Pages.

Robinson et al., "Good Practice Guide No. 133, Underwater Noise Measurement", National Physical Laboratory, ISSN: 1368-6550, 2014, 97 Pages.

Sarria et al., "Low cost OFDM based transmitter for underwater acoustic communications", Published in 2013 MTS/IEEE OCEANS, Bergen, Norway, Jun. 10-14, 2013, 4 Pages.

Schmitz et al., "Commutative Watermarking-Encryption of Audio Data with Minimum Knowledge Verification", Hindawi, Advances in Multimedia, vol. 2017, Article ID: 5879257, Mar. 20, 2017, 11 Pages.

Webb, Paul, "Introduction to Oceanography", Introduction to Oceanography, Chapter 6: 6.4 Sound, Roger Williams University, Jul. 2020, 6 Pages.

Wikipedia, "Hydrometer", Wikipedia, Accessed on Mar. 3, 2021, 8 Pages.

Wikipedia, "Malaysia Airlines Flight 370", Wikipedia, Accessed on Mar. 3, 2021, 64 Pages.

Wikipedia, "Sofar channel", Wikipedia, Accessed on Mar. 3, 2021, 7 Pages.

Wikipedia, "Underwater acoustics", Wikipedia, Accessed on Mar. 3, 2021, 15 Pages.

* cited by examiner

AUDIOMETRIC RECEIVER SYSTEM TO DETECT AND PROCESS AUDIO SIGNALS

BACKGROUND

The present invention relates generally to the field of audio processing and more particularly to a hardware system for processing multiple input sound patterns individually using an audiometric receiver and transmitter to detect and process multiple audio signals simultaneously.

Sound detected underwater is generated by a variety of natural and artificial sources at a wide range of frequencies. The most reliable signals transmitting underwater are acoustic signals that travel a much longer distance and with less loss of energy, i.e., signal strength. Most of the marine life underwater communicate to each other using these acoustic signals and construct acoustics signals to find food and detect obstacles to protect themselves. The sounds produced by many marine mammals can project for miles. Sound detection is a common practice these days in oceanography, but sound patterns detected underwater are generated by a variety of natural sources and it is challenging to detect and classify them because of the wide range of possible sources and frequencies.

SUMMARY

Aspects of an embodiment of the present invention disclose an audiometric receiver system for detecting and processing multiple audio signals simultaneously. The audiometric receiver system comprises a transmitter, wherein the transmitter comprises a digital signal processor, and wherein the digital signal processor comprises a quality check component, an amplifier or attenuator component, mixer component, a modulator component, and an encrypter component; and a receiver, wherein the receiver comprises a decrypter component, a splitter component, demodulator component, and a second amplifier or attenuator component.

DETAILED DESCRIPTION

Embodiments of the present invention recognize that sound detection is a common practice these days in oceanography, but sound patterns detected underwater are generated by a variety of natural sources and it is challenging to detect and classify them because of the wide range of possible sources and frequencies. Embodiments of the present invention further recognize that because of the wide range of possible sources and frequencies, multiple different audio sensing and processing hardware systems currently exist because each system supports a different range of frequencies. Thus, embodiments of the present invention recognize that there is a need for a simplified way to receive, process, and transmit known and unknown sound patterns underwater for monitoring of underwater activity. Monitoring of underwater activity can be done more efficiently using acoustic or audio signals over radio signals because acoustic signals are a more reliable communication medium underwater and they are how marine life communicates underwater.

In this manner, as discussed in greater detail herein, embodiments of the present invention provide a hardware system comprising two computing chips, i.e., an audiometric transmitter and receiver, to simplify the instrumentation, capture, detection, and identification of all sound pattern objects (such as marine life, wave as per moon movement, man-made ships, military sonars, submarines, routine and common activities, and unknown sources) that could be used for analytics. This hardware system would eliminate the need for a huge number of different frequency hardware to be installed and maintained to be able to handle the vast range of frequencies of audio signals produced, e.g., in the ocean.

Embodiments of the present invention provide an audiometric hardware system that works with any and all types of available sensors enabling a plurality of sensors collecting sound signals (also referred to herein as "audio signals") to be attached as inputs to the audiometric hardware system. Embodiments of the present invention provide an audiometric hardware system that merges incoming sound signals, amplifies or attenuates signal strength, and encrypts and modulates the signal for further transmission. Embodiments of the present invention provide an audiometric transmitter and receiver that can process audio signals of any frequency and then transmits the processed audio signals for further analysis. For example, the processed signal can be transmitted to an artificial intelligence (AI) based system that can isolate different audio patterns and identify all known and unknown sound patterns. Embodiments of the present invention are enabled to continuously receive inputs from the plurality of sensors and process the multiple audio signals simultaneously, so that no audio signals go undetected.

The present invention will now be described in detail with reference to the Figures.

Figure 1:
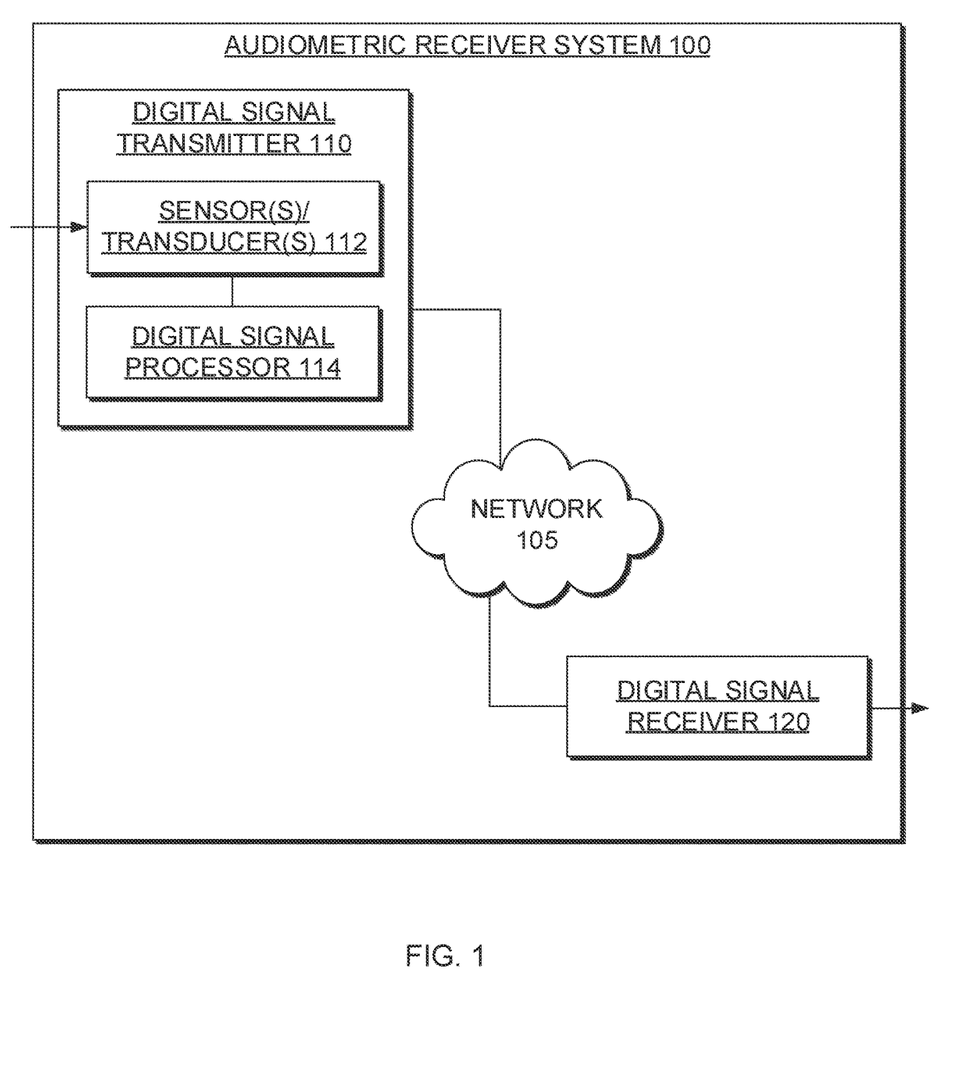
FIG. 1 depicts a block diagram of components of an audiometric receiver system, for detecting and processing multiple audio signals simultaneously, in accordance with an embodiment of the present invention.

FIG. 1 depicts a block diagram of components of audiometric receiver system 100, for detecting and processing multiple audio signals, in accordance with an embodiment of the present invention. FIG. 1 provides only an illustration of one embodiment and does not imply any limitations with regard to environments in which different embodiments may be implemented. Many modifications to the depicted environment may be made by those skilled in the art without departing from the scope of the invention as recited by the claims. In an embodiment, audiometric receiver system 100 is a hardware system that comprises a transmitter circuit on a single chip and a receiver circuit on a separate single chip. In the depicted embodiment, audiometric receiver system 100 includes digital signal transmitter 110 and digital signal receiver 120 interconnected over network 105. In an example embodiment, digital signal transmitter 110 is installed underwater and digital signal receiver 120 is installed above water at a base station (i.e., on land, on a ship) and sound signals collected and processed at digital signal transmitter 110 are transmitted to digital signal receiver 120 over network 105.

Network 105 can be, for example, a telecommunications network, a local area network (LAN), a wide area network (WAN), such as the Internet, or a combination of the three, and can include wired, wireless, radio frequency (high frequency) or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between digital signal transmitter 110 and digital signal receiver 120.

Digital signal transmitter 110 operates to accept inputs (i.e., sound signals) from sensor(s)/transducer(s) 112 communicatively connected to digital signal transmitter 110 and process the input sound signals using digital signal processor 114 before re-transmission of a single encrypted signal to be received by digital signal receiver 120. In the depicted embodiment, digital signal transmitter 110 includes sensor(s)/transducer(s) 112 and digital signal processor 114. Sensor(s)/transducer(s) 112 represent any number of sensors and/or transducers (e.g., Acoustic Vector sensor, Hydrophone, Hydrogel microphone, and Sonobuoys sensor) that can detect sound signals at any audio signal range as known to a person of skill in the art. In an embodiment, digital signal transmitter 110 includes an analog signal input pin and a digital signal input pin, i.e., digital signal transmitter 110 can receive analog signal inputs and digital signal inputs from sensors and/or transducers that can receive and output analog and/or digital signals. Digital signal processor 114 may include internal and external hardware components, as depicted and described in further detail with respect to FIG. 2.

Digital signal receiver 120 operates to collect this re-transmitted single encrypted signal from digital signal transmitter 110 and perform a reverse processing involving decryption, demodulation, splitting the merged signal into individual signals, and amplification/attenuation. In an embodiment, digital signal receiver 120 sends the reverse processed signals to an application programming interface (API) based classification system for further processing and analysis, e.g., to determine known and unknown sound patterns. Digital signal receiver 120 may include internal and external hardware components, as depicted and described in further detail with respect to FIG. 3.

Figure 2:
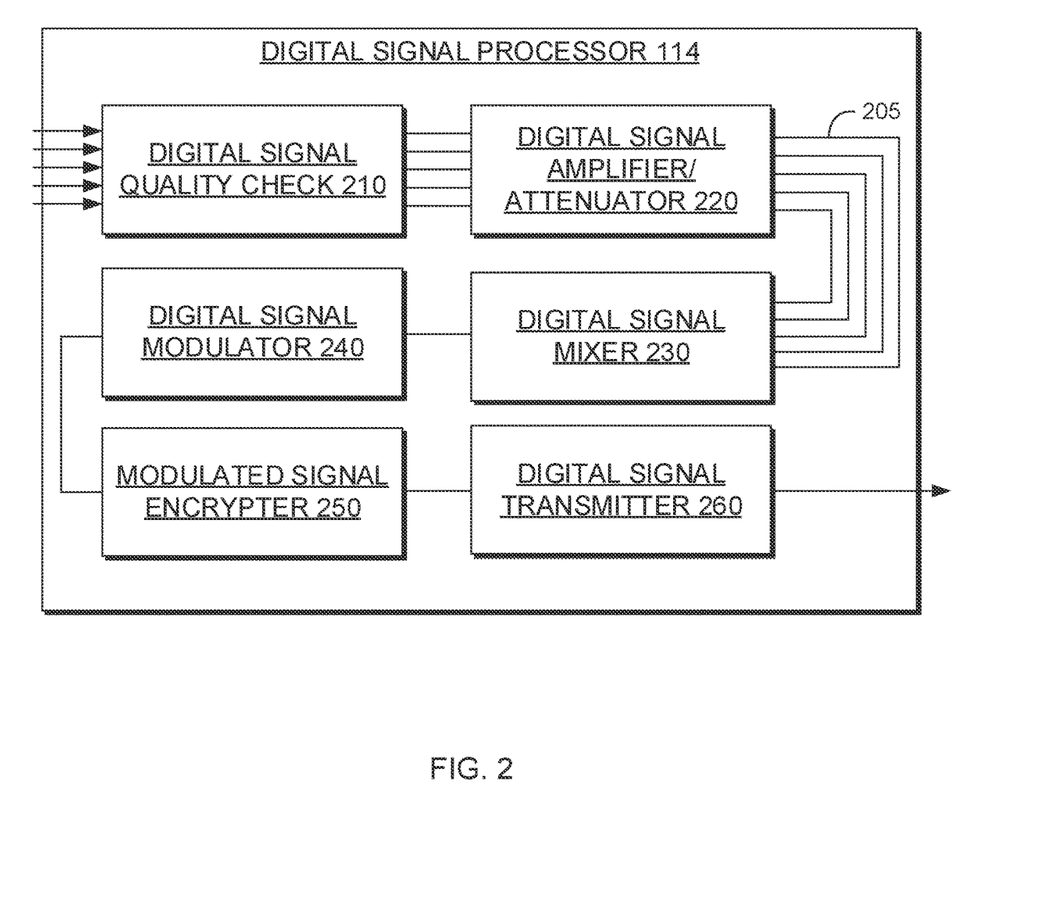
FIG. 2 depicts a block diagram of components of a digital signal processor of the audiometric receiver system of FIG. 1, in accordance with an embodiment of the present invention.

FIG. 2 depicts a block diagram of components of digital signal processor 114 of audiometric receiver system 100 of FIG. 1, in accordance with an embodiment of the present invention. In the depicted embodiment, digital signal processor 114 includes signal path 205, digital signal quality check 210, digital signal amplifier/attenuator 220, digital signal mixer 230, digital signal modulator 240, modulated signal encrypter 250, and digital signal transmitter 260. Digital signal processor 114 includes both an analog signal input pin and a digital signal input pin (not shown). Any analog signals that come in through the analog signal input pin are converted to a digital signal using an analog to digital converter (ADC) as known to a person of skill in the art.

Signal path 205 shows the path of sound signals detected by sensor(s)/transducer(s) 112, inputted into digital signal processor 114 through either an analog signal input pin or a digital signal input pin, processed through each component of digital signal processor 114, and output by digital signal transmitter 260. As depicted, signal path 205 is shown as five input (signals) arrows then lines, but could be any number of input signals, that are processed through digital signal quality check 210, digital signal amplifier/attenuator 220, and digital signal mixer 230. Then, signal path 205 becomes one line (signal) processed through digital signal modulator 240, modulated signal encrypter 250, and digital signal transmitter 260.

Digital signal quality check 210 operates to check received signals for quality and improve acoustic metrics (noise reduction, pressures, etc.) as needed. The received signals flow either directly from a digital signal input pin or from an ADC that converted received analog signals to digital signals. Digital signal quality check 210 identifies the signal power, amplitude, and frequency of each sound signal received and outputs the modified signals to digital signal amplifier/attenuator 220.

Digital signal amplifier/attenuator 220 operates to amplify or attenuate the signal power, amplitude, and frequency (as identified by digital signal quality check 210) of each sound signal received. Digital signal amplifier/attenuator 220 amplifies or reduces each signal to a pre-set level as required for further processing and outputs the modified signals to digital signal mixer 230. Amplifying or attenuating a signal ensures the signal can travel a long distance without any data loss. For example, a sound signal captured by a specific transducer could be weak because of the distance of a source signal generator from the transducer or due to interference of signals from other nearby sources, and therefore, digital signal amplifier/attenuator 220 amplifies that sound signal to the pre-set level.

Digital signal mixer 230 operates to mix or merge the modified signals into one signal because it is easier to encrypt and transmit one signal versus several signals. Digital signal mixer 230 ensures necessary header and footer is attached between each modified signal to form the one signal, which will help to separate them back into individual signals later. Digital signal mixer 230 outputs the one signal to digital signal modulator 240.

Digital signal modulator 240 operates to modulate the one signal using simple Frequency Modulation circuit to produce a modulated signal suited to the characteristics of the transmission channel (e.g., network 105) and output the modulated signal to modulated signal encrypter 250. In an embodiment, digital signal modulator 240 adds a booster signal to the one signal to ensure the one signal can travel long distances when transmitted.

Modulated signal encrypter 250 operates to encrypt the modulated signal using Assemble code written in assembly language stored in Electrically Erasable Programmable Read Only Memory (EEPROM) to protect from hackers, in which the logic for encoding would include various parameters like date, time, packet header combination, etc., thus making the encryption stronger. From the EEPROM, modulated signal encrypter 250 pulls a stored encryption code/algorithm, such as commutative watermarking encryption (CWE). By having the built-in EEPROM, modulated signal encrypter 250 is enabled to use different or dynamically changing encryption seed algorithms to further strengthen the encryption. Modulated signal encrypter 250 outputs the encrypted signal to digital signal transmitter 260.

Digital signal transmitter 260 is connected to a transmission antenna (e.g., network 105) and is responsible for transmitting the encrypted signal to digital signal receiver 120.

Figure 3:
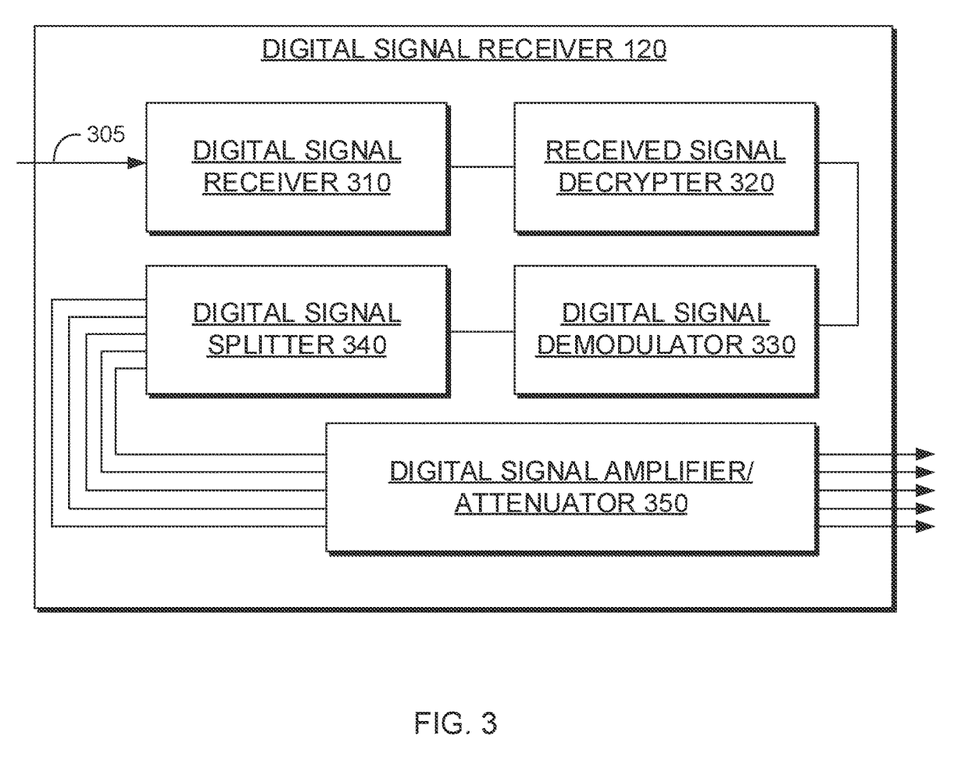
FIG. 3 depicts a block diagram of components of a digital signal receiver of the audiometric receiver system of FIG. 1, in accordance with an embodiment of the present invention.

FIG. 3 depicts a block diagram of components of digital signal receiver 120 of audiometric receiver system 100 of FIG. 1, in accordance with an embodiment of the present invention. Digital signal receiver 120 essentially performs the reverse process of digital signal processor 114 to reproduce the individual signals as captured by sensor(s)/transducer(s) 112. In the depicted embodiment, digital signal receiver 120 includes digital signal receiver 310, received signal decrypter 320, digital signal demodulator 330, digital signal splitter 340, and digital signal amplifier/attenuator 350.

Signal path 305 shows the path of the encrypted signal transmitted by a transmission antenna, received by a receiver antenna of digital signal receiver 310, and processed through received signal decrypter 320, digital signal demodulator 330, digital signal splitter 340, and digital signal amplifier/attenuator 350. As depicted, signal path 305 is a single line/arrow until after processed by digital signal splitter 330 when signal path 305 becomes five lines/arrows until output by digital signal receiver 120. It is to be appreciated that the number of signals after processed by digital signal splitter 340 would match the number of signal originally received by digital signal transmitter 110, which as depicted in FIG. 2 is five.

Digital signal receiver 310 operates to receive, by a receiver antenna, the encrypted signal transmitted from digital signal transmitter 110 and output the encrypted signal to received signal decrypter 320.

Received signal decrypter 320 operates to decrypt the encrypted signal using the same algorithm modulated signal encrypter 250 used to encrypt the signal. Received signal decrypter 320 outputs the decrypted signal to digital signal splitter 330.

Digital signal demodulator 330 operates to demodulate the decrypted signal to extract the original signal (as received by digital signal transmitter 110) from the received signal (as received by digital signal receiver 120). Digital signal demodulator 340 outputs the demodulated signal to digital signal splitter 340. In an embodiment, digital signal demodulator 330 removes the booster signal added by digital signal modulator 240.

Digital signal splitter 340 operates to split or separate the demodulated signal into the original individual signals based on each header and footer in the demodulated signal. Digital signal splitter 330 outputs the individual signals to digital signal amplifier/attenuator 350.

Digital signal amplifier/attenuator 350 operates to amplify or attenuate the individual signals to a pre-set level as required for further processing. Digital signal amplifier/attenuator 350 amplifies weaker signals and attenuates signals with too high an amplitude. Digital signal amplifier/attenuator 350 outputs the individual signals enabling digital signal receiver 120 to output the individual signals for further processing.

Figure 4A:
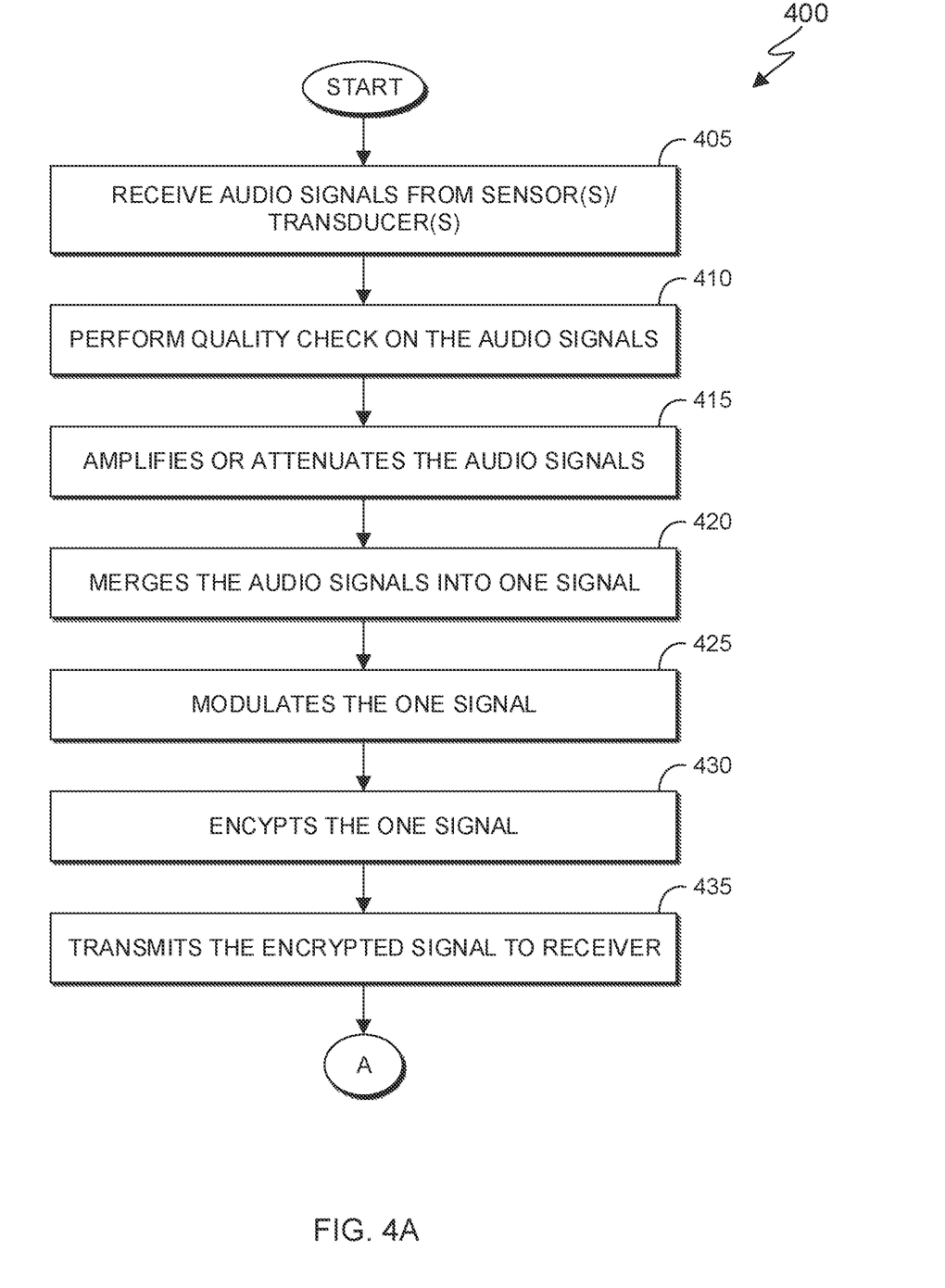
FIGS. 4A and 4B are a flowchart depicting operational steps of method of operating the audiometric receiver system of FIG. 1, in accordance with an embodiment of the present invention.
Figure 4B:
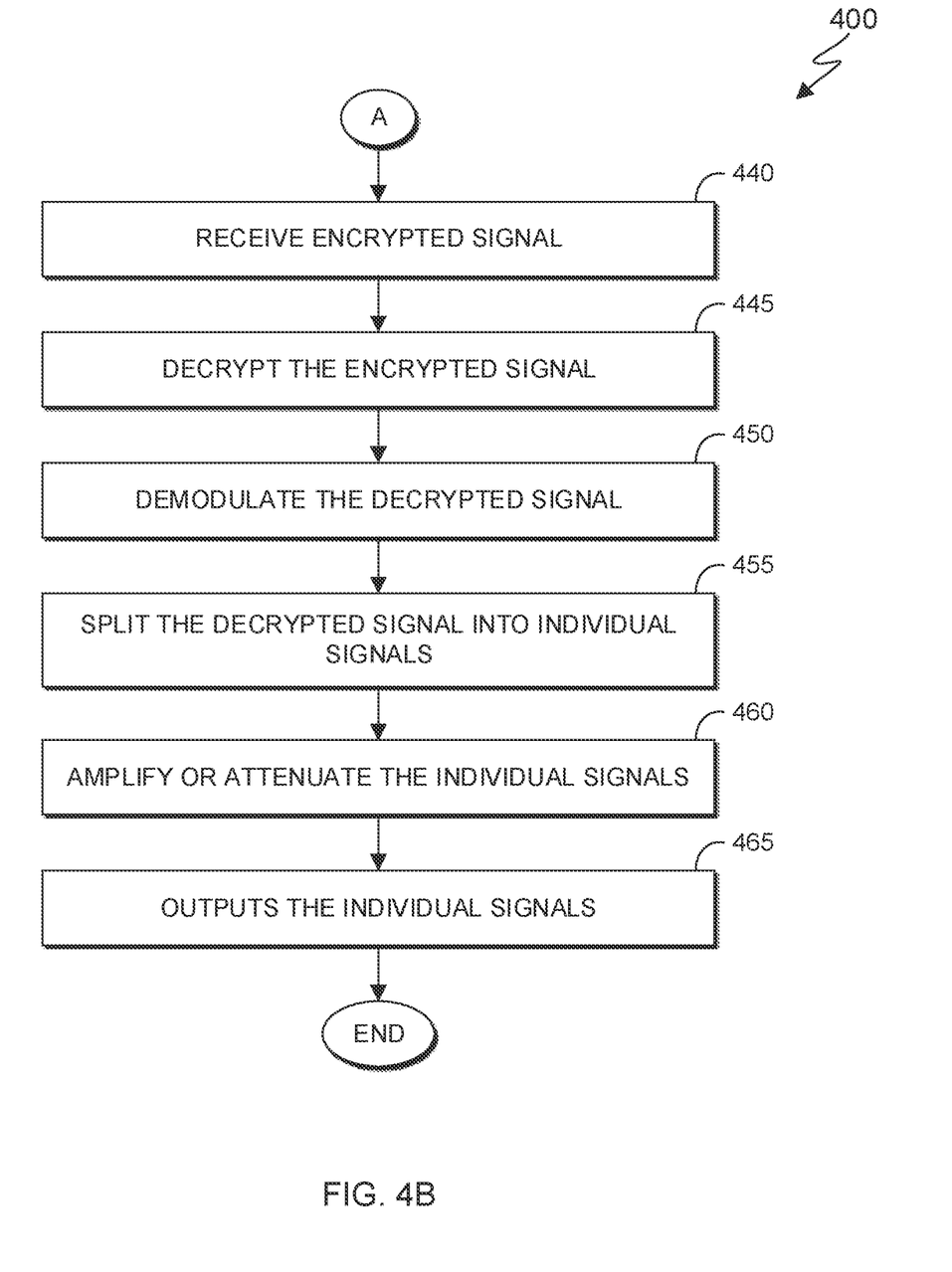

FIGS. 4A & 4B depict a flowchart with operational steps of method 400 of operating audiometric receiver system 100 of FIG. 1, in accordance with an embodiment of the present invention.

In step 405, audiometric receiver system 100 receives audio signals from sensor(s)/transducer(s). In an embodiment, audiometric receiver system 100 receives, at either an analog signal input pin or a digital signal input pin, audio signals captured by sensor(s)/transducer(s) 112. In an embodiment, audiometric receiver system 100 continuously receives, at either an analog signal input pin or a digital signal input pin, audio signals captured by sensor(s)/transducer(s) 112.

In step 410, audiometric receiver system 100 performs a quality check on the audio signals. In an embodiment, responsive to receiving the audio signals, audiometric receiver system 100 performs a quality check on the audio signals. In an embodiment, audiometric receiver system 100 performs a quality check on the audio signals to improve acoustic metrics (noise reduction, pressures, etc.), as needed, using a digital signal quality check component (as described above in FIG. 2) that identifies the signal power, amplitude, and frequency of each sound signal received.

In step 415, audiometric receiver system 100 amplifies or attenuates the audio signals. In an embodiment, responsive to performing the quality check on the audio signals, audiometric receiver system 100 amplifies or attenuates the audio signals. In an embodiment, audiometric receiver system 100 amplifies or attenuates the signal power, amplitude, and frequency of each audio signal received using a digital signal amplifier/attenuator component (as described above in FIG. 2) that amplifies or attenuates each signal to a pre-set level as required for further processing.

In step 420, audiometric receiver system 100 merges the audio signals into one signal. In an embodiment, responsive to amplifying or attenuating the audio signals, audiometric receiver system 100 merges the audio signals into one signal. In an embodiment, audiometric receiver system 100 merges the audio signals into one signal using a digital signal mixer component (as described above in FIG. 2) that attaches a necessary header and footer between each modified signal to form the one signal, which will help to separate them back into individual signals later.

In step 425, audiometric receiver system 100 modulates the one signal. In an embodiment, responsive to merging the audio signals into one signal, audiometric receiver system 100 modulates the one signal. In an embodiment, audiometric receiver system 100 modulates the one signal using a digital signal modulator component (as described above in FIG. 2) that produces a modulated signal suited to the characteristics of the transmission channel, e.g., by adding a booster signal to ensure transmission over long distances.

In step 430, audiometric receiver system 100 encrypts the one signal. In an embodiment, responsive to modulating the one signal, audiometric receiver system 100 encrypts the one signal. In an embodiment, audiometric receiver system 100 encrypts the one signal using a modulated signal encrypter component (as described above in FIG. 2) that produces an encrypted signal using a dynamically changing encryption seed algorithms.

In step 435, audiometric receiver system 100 transmits the encrypted signal. In an embodiment, responsive to encrypting the one signal, audiometric receiver system 100 transmits the encrypted signal. In an embodiment, audiometric receiver system 100 transmits the encrypted signal to a digital signal transmitter component (as described above in FIGS. 2 & 3).

In step 440, audiometric receiver system 100 receives the encrypted signal. In an embodiment, audiometric receiver system 100 receives, at a digital signal receiver of the digital signal transmitter component, the encrypted signal (as described above in FIG. 3).

In step 445, audiometric receiver system 100 decrypts the encrypted signal. In an embodiment, responsive to receiving the encrypted signal, audiometric receiver system 100 decrypts the encrypted signal. In an embodiment, audiometric receiver system 100 decrypts the encrypted signal using a received signal decrypter component (as described above in FIG. 3) that uses the same seed algorithm used by the modulated signal encrypter component to produce a decrypted signal.

In step 450, audiometric receiver system 100 demodulates the decrypted signal. In an embodiment, responsive to decrypting the encrypted signal, audiometric receiver system 100 demodulates the decrypted signal. In an embodiment, audiometric receiver system 100 demodulates the decrypted signal using a digital signal demodulator component (as described above in FIG. 3) that demodulates the decrypted signal to extract the original signal (as received by digital signal transmitter 110) from the received signal (as received by digital signal receiver 120) by removing the booster signal added to the original signal.

In step 455, audiometric receiver system 100 splits the demodulated signal into individual signals. In an embodiment, responsive to demodulating the decrypted signal, audiometric receiver system 100 splits the one signal into individual signals. In an embodiment, audiometric receiver system 100 splits the one signal into individual signals using a digital signal splitter component (as described above in FIG. 3) that splits or separates the demodulated signal based on each header and footer surrounding each individual signal to produce the individual signals.

In step 460, audiometric receiver system 100 amplifies or attenuates the individual signals. In an embodiment, responsive to splitting the one signal into the individual signals, audiometric receiver system 100 amplifies or attenuates the individual signals. In an embodiment, audiometric receiver system 100 amplifies or attenuates the individual signals using a digital signal amplifier/attenuator component (as described above in FIG. 3).

In step 465, audiometric receiver system 100 outputs the individual signals. In an embodiment, responsive to amplifying or attenuating the individual signals, audiometric receiver system 100 outputs the individual signals. In an embodiment, the digital signal transmitter component of audiometric receiver system 100 outputs the individual signals, for example, for further processing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An audiometric receiver system comprising:
   a transmitter, wherein the transmitter comprises a digital signal processor, and wherein the digital signal processor comprises a quality check component, an amplifier or attenuator component, a mixer component that merges individual audio signals modified by the amplifier or attenuator component into one signal and includes a respective header and footer between each audio signal merged into the one signal, a modulator component, and an encrypter component; and
   a receiver, wherein the receiver comprises a decrypter component, a demodulator component, a splitter component that splits the one signal into the individual audio signals based on the respective header and footer between each audio signal in the one signal, and a second amplifier or attenuator component.

2. The audiometric receiver system of claim 1, wherein the transmitter further comprises an analog signal input pin and a digital signal input pin enabled to receive audio signals from at least one sensor or at least one transducer communicatively coupled to the transmitter.

3. The audiometric receiver system of claim 1, wherein the transmitter processes received audio signals using the digital signal processor to produce a single encrypted audio signal and sends the single encrypted audio signal to the receiver.

4. The audiometric receiver system of claim 1, wherein the quality check component improves acoustic metrics of received audio signals and identifies a signal power, an amplitude, and a frequency for each of the received audio signals.

5. The audiometric receiver system of claim 1, wherein the amplifier or attenuator component amplifies or attenuates received audio signals to a pre-set level to produce modified audio signals to ensure the modified audio signals can be sent a distance without data loss.

6. The audiometric receiver system of claim 1, wherein the modulator component modulates the one signal by adding a booster signal to produce a modulated signal.

7. The audiometric receiver system of claim 6, wherein the encrypter component encrypts the modulated signal using commutative watermarking encryption to produce an encrypted signal.

8. The audiometric receiver system of claim 3, wherein the receiver performs a reverse processing on the single encrypted audio signal to re-produce the received audio signals.

9. The audiometric receiver system of claim 7, wherein the decrypter component decrypts the encrypted signal to produce a decrypted signal.

10. The audiometric receiver system of claim 9, wherein the demodulator component demodulates the decrypted signal to produce a demodulated signal.

11. The audiometric receiver system of claim 10, wherein the splitter component splits the demodulated signal into the individual audio signals.

12. The audiometric receiver system of claim 11, wherein the second amplifier or attenuator component amplifies or attenuates the individual signals to a second pre-set level.

13. A method of processing audio signals using an audiometric receiver system comprising:
   receiving, at an input pin of an audiometric receiver of the audiometric receiver system, individual audio signals from at least one sensor or transducer;
   processing, by a digital signal processor of the audiometric receiver of the audiometric receiver system, the individual audio signals to produce a single processed signal, wherein processing the individual audio signals to produce the single processed signal comprises merging the individual audio signals into the single processed signal by attaching a header and footer between each audio signal to form the single processed signal;
   transmitting, by the audiometric receiver, the single processed signal to an audiometric transmitter of the audiometric receiver system;
   receiving, at the audiometric transmitter, the single processed signal;
   processing, by the audiometric transmitter, the single processed signal to split the single processed signal into the individual audio signals based on the respective header and footer between each audio signal to reproduce the individual audio signals; and
   transmitting, by the audiometric transmitter, the individual audio signals.

14. The method of claim 13, wherein processing the individual audio signals to produce the single processed signal further comprises:
   amplifying or attenuating the individual audio signals to a pre-set level as required for further processing;
   modulating the single processed signal; and
   encrypting the single processed signal using a dynamic encryption seed algorithm.

15. The method of claim 14, wherein processing the single processed signal to reproduce the individual audio signals comprises:
   decrypting the one signal using the dynamic encryption seed algorithm as it was when the single processed signal was encrypted;
   demodulating the one signal;
   splitting the one signal into the individual audio signals; and
   amplifying or attenuating the individual audio signals.

* * * * *